Dec. 6, 1966 A. V. ALEXEFF 3,290,026
HEATING MEANS FOR STRIP MATERIAL
Original Filed May 26, 1961 2 Sheets-Sheet 1

INVENTOR.
ALEXANDER V. ALEXEFF
BY
Ely Pearne & Gordon
Attorneys

INVENTOR.
ALEXANDER V. ALEXEFF

United States Patent Office 3,290,026
Patented Dec. 6, 1966

3,290,026
HEATING MEANS FOR STRIP MATERIAL
Alexander V. Alexeff, Cleveland, Ohio, assignor to Industrial Ovens, Incorporated, Cleveland, Ohio, a corporation of Ohio
Original application May 26, 1961, Ser. No. 116,645. Divided and this application Dec. 9, 1963, Ser. No. 345,546
8 Claims. (Cl. 263—3)

This application is a divisional application with respect to my copending application, Serial No. 116,645, filed May 26, 1961, now Patent No. 3,166,304, which in turn was a continuation-in-part of my application, Serial No. 100,751, filed April 4, 1961, now abandoned.

This invention relates to line processing of webs and strands, and particularly to means for accomplishing deep heating and precise and responsive control of the treatment of strips of material in applications where such deep heating or responsive control has not heretofore been possible or satisfactory, and to means for greatly improving the uniformity of heat application over an interface between a strip and an array of heating elements or a heating face, or the like.

For the purposes of this application, "strands" is to be understood to include monofilaments, yarns, wires, cords, narrow tapes, and ribbons, and the like; and "strips" is to be understood to include strands and also webs such as sheet metal, paper, textiles, films, both woven and unwoven fabrics, and wide tapes. In certain aspects, the invention has peculiar applicability to the treatment of metal strip.

The invention has promise in applications where deep heating of a strip is required on a continuous basis, as for example in annealing of stainless steal or aluminum, and particularly where deep heating must be accomplished without excess surface temperature. The invention also offers great advantages in applications where heating must be accomplished in an inert atmosphere. According to the invention, deep heating of the passing strip may be accomplished in an inert atmosphere without excessive surface temperatures, all in a manner which makes possible control of temperatures within close tolerances and on a continuous basis which may be governed by control means responsive to temperature, speed, tension or stretch of the web or other sensed values.

The invention involves the concept of providing an endless train or trains of heating elements having a reach extending along the passing strip to define a heating interface or area of presentation of the heating elements to the strip, with the endless train of heating elements being continuously swept through the area of presentation by drive means.

Where a web is passing an array of heating elements, the uniformity of heat along the heating interface may not be of particular significance provided the range of variation is within reasonable limits, because each increment of the strip length sweeps past the entire heating interface so that succeeding increments receive uniform treatment. However where the heating interface area is varied, lack of uniformity may have great significance, because the variation of heat input into the web will not be a regular function of the variation of interface area if the heat output distribution along the interface area in the direction of strip travel is non-uniform. In these respects, the present invention is particularly significant in its accomplishment of substantially absolute uniformity throughout the heating interface area so that heat output varies as a precise and regular function of variation of interface area.

In another important aspect, the invention contemplates an accomplishment of quick cool operation when desired, for example, when the movement of the strip is stopped by reversal of the endless train of heating elements which on their normal egress reach may travel through a relatively cool zone, such egress reach becoming the entrance reach upon reversal of the train.

In the above mentioned heat treatment of metals, rather high temperatures may be required together with deep penetration through the thickness of the hot metal sheet or strip. For example, in the annealing of stainless steel, it may be desirable to achieve temperatures of 1200° or 1400° F. In the tinning of steel or zinc coating of steel, temperatures from 500° to 700° F. are typical. In the annealing of aluminum, temperatures of 400° to 700° F. are typical. The annealing of aluminum presents an example of the desirability of surface temperature control, particularly where color application is accomplished at the same time as the passing strip is annealed. Since the baking of the color on the surface cannot be successfully accomplished above temperatures that are relatively lower, say 400° or 500°, as compared with the internal annealing temperature required which may be somewhat above 500°, the present invention makes it possible to successfully accomplish such operations and to do so, if desired, in an inert atmosphere.

Although the invention contemplates many applications where the heating will not be in an inert atmosphere, the accomplishment of heating within such an atmosphere by radiated black bodies of steel, or by ceramic brick of the types known for radiant heating use, or other radiating bodies, may be of great significance, particularly in applications where close and responsive control of the heating is required. It has heretofore been conventional to employ electric heating means and the like in inert-atmosphere applications, but a serious disadvantage has been the relatively undesirable spectrum of the radiated energy. Electric elements, like some black bodies, tend to radiate heat energy in the lower frequency portions of the spectrum. However, the present invention contemplates the employment of ceramic hot bodies or other hot bodies which have the desirable characteristic of radiating predominately in the infrared end of the heat spectrum, such bodies being heated outside the inert atmosphere and then being transported to the inert atmosphere for the strip heating operation.

In one aspect, the invention contemplates the provision of heating elements other than hot bodies, as for example, electric heating elements or the like, such arrangements being advantageous in respect of the accomplishment of heat-input uniformity along the heating interface between the heating elements area and the passing strip, and in other respects.

These and other advantages and features of the invention will become apparent from the following description of embodiments of the invention. As will be apparent to those familiar with strip processing, specific mechanical, electrical or hydraulic equipment components to be employed in any given installation are a matter of choice within the routine skill of the art. Such components in each illustrated embodiment are therefore illustrated schematically or diagrammatically in the interest of clarity in order that the invention iself may be most concisely and completely described and understood.

In the drawings:

FIGURE 1 is a schematic side elevation, partly in cross-section, illustrating apparatus embodying the invention and emphasizing certain aspects thereof. A portion of FIGURE 1 is purely diagrammatic. The schematic cross-sectional portion of FIGURE 1 is taken from the plane of line 1—1 in FIGURE 2.

FIGURE 2 is a schematic cross-section taken from the plane of line 2—2 in FIGURE 1.

FIGURES 1 and 2 illustrate a strip processing installation which might be employed for heat treating metal sheet on a continuous or semi-contiuous basis. A strip of such sheet material 10 travels along a given path which in the particular example happens to be vertical as seen in FIGURE 1.

A pair of endless trains of heating elements 11 and 12 are provided. Each train of heating elements has a reach extending along the path of travel of the strip 10 between points of convergence and divergence with the path of travel of the strip 10. In many applications, it is advantageous to drive the endless trains in such a direction that their direction of travel along the heating reach is in the opposite direction to that of the strip 10. Therefore neither the entrance end nor the egress end of this reach can with assurance be characterized as either the point of convergence or the point of divergence with the treated strip. Therefore the term "train and strip path juncture" is used herein as applicable to both convergences and divergences.

Figures 1, 2:
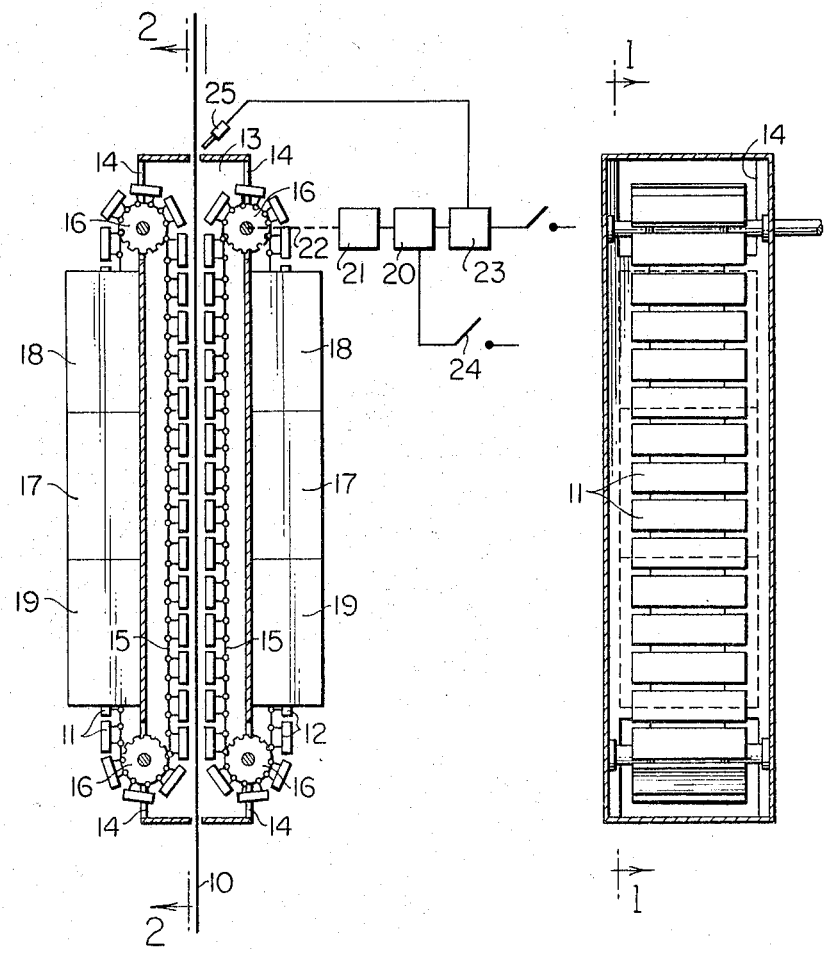

In the illustrated apparatus, the heating reach is enclosed within a heating chamber or housing 13 which may have openings 14 at the entrance and egress ends of the endless trains of heating elements. In the illustrated embodiment, the heating elements may each comprise a steel plate of say ½" thickness and one-foot width, the length of the plates roughly corresponding to the width of the strip being treated. Each plate is tied at each end by a rigid links to an endless chain 15 which turns on sprockets 16. It will be understood that each of the endless chains 15 and sprockets 16 as seen in FIGURE 1 directly overlies another endless chain or sprocket, respectively.

At a location outside the heating reach, each of the endless trains travels through a heating means 17 which may comprise a battery of oil or gas burners or ovens or the like which may or may not be enclosed as illustrated. In the particular embodiment shown, the trains of elements 11 and 12 pass from the heating zones to the heat dissipation zones 18 which may or may not be enclosed as shown. The heat dissipation zones 18 may include or be associated with heat recuperation means or heat exchangers or the like for accomplishing recovery of heat or use of the heat in other locations. From the heat dissipation zones 18 the heating elements 11 and 12 travel through the openings 14 into the heating reach to continuously sweep through the presentation area between the passing strip 10 and the endless paths of travel of the heating elements.

The trains of elements 11 and 12 are driven by a reversible motor 20 through a speed reducer 21 and a linkage 22. The linkage 22 is schematically illustrated as associated with the closest of the sprockets 16, but it will be understood that it is appropriately linked for driving relationship with one or more sprockets 16 associated with each of the endless trains 11 and 12.

Hot bodies such as the elements 11 and 12 do not lose heat at a constant rate after being heated as by the heating means 17. At their higher temperatures, as immediately after leaving the heating means 17, the elements 11 and 12 lose heat at a relatively fast rate which diminishes as time goes by. Therefore the longer it takes each element 11 and 12 to reach the presentation area, the greater will be the ratio of (1) heat dissipated prior to the presentation area to (2) heat dissipated at the presentation area.

Means is provided for continuously varying the speed of the endless trains of heating elements by varying the speed of the motor 20. In the illustrated case such variation is responsive to temperatures sensed by a radiation pyrometer 25 which senses web temperature at the end of the web's travel past the presentation area between the heating elements and the web. Through a suitable and conventional control potentiometer 23, the motor 20 is controlled in response to sensed temperature. The control potentiometer 23 controls the speed of the motor 20. Upon increase in the temperature sensed by the radiation pyrometer 25, the control potentiomter 23 decreases the speed of the motor 20 thereby decreasing the velocity of the endless trains of elements 11 and 12 and increasing the time of travel of each of the elements 11 and 12 into and from the associated heat dissipation zones 18 upon each circuit of travel of the element throughout the endless extent of its associated train of heating elements. The result is a relatively high heat loss within the heat dissipation zones 18 and a consequent reduction in heat delivered to the strip 10. It will be understood that the zones 18, or other baffling of ducting or kiln-like structure, may be employed to extend the heat dissipation zones 18 to a location almost contiguous with the commencement of the heating reach of each of the endless trains of heating elements, a showing of such an array being avoided in FIGURE 1 in order to avoid obscuring the schematic showing.

The endless trains on their return from the heating reach into the heat input means 17 may pass through relatively cold zones 19 which, like the heat dissipation zones 18, may comprise heat recuperation means or preheating heat exchanger arrays or the like.

The motor 20 may be reversible by suitable control means governed by an override switch 24 which may be tied in by any suitable means (not shown) with shutdown of the line 10, whereby the trains 11 and 12 are reversed in direction. This tends to quickly reduce the temperatures along the heating reach of the endless trains by the introduction of relatively cool heating elements. In the somewhat diagrammatic showing of FIGURE 1, the lengths of the zones 19 appear quite small. In actual practice, the zone or zones 19 may be of considerable length and may include a series of festoons of the heating elements 11 and 12 and associated chain portions so that in effect, at any time during the continuous operation of the apparatus, a considerable "reservoir" or accumulation of relatively cool elements remains from moment to moment available beyond the output side of the heating reach ready to be brought back in along the heating reach as by reversal of the motor 20.

It will be understood that the heating elements 11 and 12, after passing from the heat input means 17, continuously radiate heat as they pass around the extent of the endless trains, the heat being in the form of radiated energy which has the capability of heating the interior as well as the surface portions of the passing strip 10, the interior temperature approaching, and in many applications with the proper selection exceeding, the surface temperature of the strip. In the latter case, the surface temperature may be slightly reduced by the movement of ambient air or other gases due to the motion of the strip 10 or the trains 11 and 12 or due to other deliberately introduced cooling arrangements such as gas or air blasts or the like.

It will be apparent that the heating chamber or housing 13 may enclose an inert atmosphere, which may be maintained by suitable curtains of moving gas or other isolating means at the openings 14 and in the zones of entrance and egress of the strip 10, such curtaining or isolating means for oven chambers or other contained atmospheres through which strips are to move being well known in the art.

Figure 3:
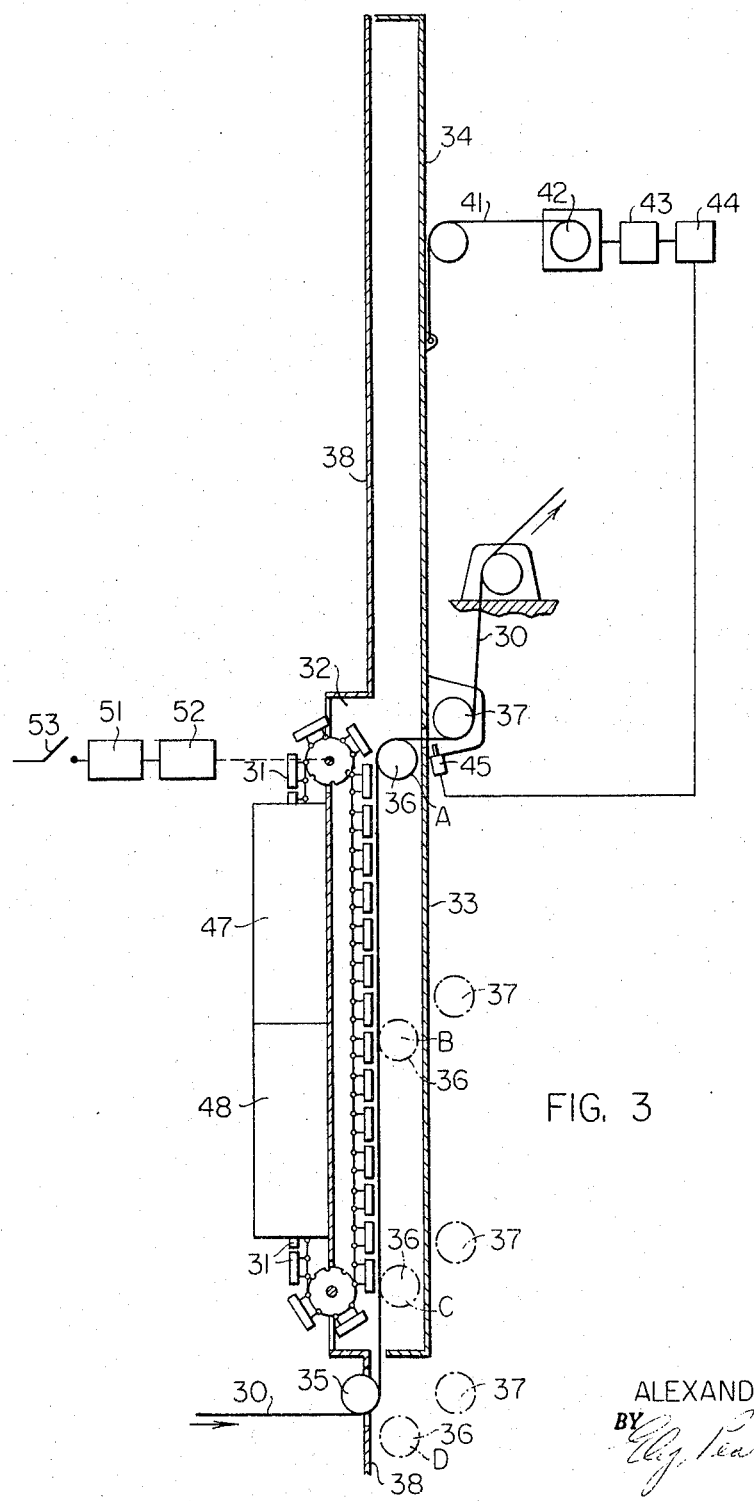
FIGURE 3 is a schematic side elevation, partly in cross-section, illustrating apparatus embodying the invention and emphasizing certain aspects thereof.

FIGURE 3 illustrates a strip processing operation which might be employed where an array of heating units in the form of an endless train is combined with means for varying distance between train and strip path junctures at opposite extremes of the area of presentation between the heating elements and the strip being treated.

A train of heating elements 31 is shown in FIGURE 3 passing trhough a heating chamber 32. Associated with the heating chamber is a movable wall 33 having a long top extension 34 which serves to close the chamber 32 at lower positions of the apparatus as will become clear below.

A strip 30 passes around an entering guide roll 35 and outfeed rolls 36 and 37, the outfeed roll 37 being located exteriorly to the movable wall or chamber portion 33. The rolls 36 and 37 and the movable chamber portion 33 are mounted for bodily movement together. It will be understood that as the rolls 36 and 37 and the chamber portion 33 move downwardly from the position shown in FIGURE 3, the upper portion 34 of the chamber 33 moves downwardly along the upper portion of the stationary closure wall 38 and along the length of the heating reach of the heating elements 31 to maintain the closure of the chamber 32. The lower portion of the chamber moves along the portion of the stationary closure wall 38 which depends from the chamber 32. It should be noted, however, that in some applications a chamber enclosure may not be required, and that where enclosure of the heating chamber is required, other arrangements may be provided for maintaining the closure.

It will be apparent that in FIGURE 3, the presentation area of the heating elements to the strip is defined between two train and strip path junctures, one train and strip path juncture occurring where the train of heating elements 31 and the lower end of the incoming strip 30 meet and the other train and strip path juncture occurring at the roll 36 where the strip 30 abruptly diverges from the endless train of heating elements 31.

In the illustrative condition of the apparatus, the distance between the respective train and strip path junctures (and consequently the presentation area between the heating elements and the strip) is at a maximum corresponding to the illustrated position "A" of the roll 36. When the rolls and associated moving portions of the chamber structure are lowered until the roll 36 occupies position "B" the presentation area is reduced to approximately one-half its original value. When the roll 36 reaches the position "C," the distance between the train and strip path junctures is substantially zero and the presentation area is reduced to substantially zero. In the particular apparatus illustrated, the outfeed roll 36 is capable of moving even beyond the zero presentation area position to a position "D" where it may be desirable to translate the roll upon complete stoppage of the line.

In the illustrated apparatus, means for varying the distance between the above-mentioned train and strip path junctures comprises a linkage 41 adapted to be taken up on and let off the windlass 42, which is adapted to be driven back and forth by a reversible servomotor 43, the total angular displacement of which is controlled by a conventional control potentiometer 44. A radiation pyrometer 45 is mounted for movement with the rolls 36 and 37, and is adapted to sense temperature of the web at the outfeed end of the heat treating station. Through the control potentiometer 44, the servomotor 43 is controlled in response to sensed temperature, so that upon increase in temperature the roll 36 is lowered and upon decrease in temperature the roll 36 is raised, the roll 36 normally hovering about an intermediate position, such as the position "B" or a position at least somewhat below the fully raised position "A."

Instead of re-lowering the movable wall 33 and rolls 36 and 37 as described above, the train 31, chamber 32, and wall portions 38 (now no longer stationary) may be raised to vary the distance between the above-mentioned train and strip path junctures. If there is resulting interference with the roll 35, this roll may be eliminated and the incoming web 30 may approach the apparatus along a vertical path.

Both the above-described motions may be combined, if desired.

The heating elements 31 may comprise heat generating elements, such as electric heating elements or the like, or they may comprise ceramic or metal hot bodies similar to those described in connection with the example of FIGURES 1 and 2. In the latter case, the hot bodies may travel through a heat input device 47, which may comprise oil burners or gas burners or the like in an oven zone. It will be understood that the train of heating elements 31 would in such a case normally rotate in a direction such that the train passes downwardly opposite to the direction of strip movement along the heating reach. The elements 31 might thence pass upwardly through a heat exchanging or recovery or pre-heating zone 48, which also would serve the function of cooling the heating elements 31. The heating elements 31 may within the zone 48 be festooned or the length of travel or the cooling effect thereon may be otherwise intensified. A drive motor 51 and speed reducer 52 may be provided for the endless train 31.

The control elements for the motor 51 may include a control switch 53 which is closed upon shutdown of the processing line to reverse the motor 51 and thereby immediately introduce cool heating elements 31 within the chamber 32 and along the heating reach. This is most appropriate to heating with hot bodies rather than heating elements of the heat generating type.

The above description of the invention should make it apparent that the invention may be embodied in many different specific strip processing arrangements. The present disclosure of the invention will suggest many possibilities for specific installations which are especially designed to meet particular conditions and operating requirements. The scope of the invention is not limited to details of the exemplary embodiments but is defined by the claims which follow.

What is claimed is:

1. Heating apparatus for treating a strip traveling along a given path comprising at least one endless train of heating elements having a reach extending along said path to define an area of presentation of said heating elements to said strip, means for driving said endless train to continuously sweep said elements through said presentation area, means for varying said presentation area.

2. Heating apparatus for treating a strip traveling along a given path comprising at least one endless train of heating elements having a reach extending along said path between two train-an-strip path-junctures with respect to said path to define an area of presentation of said heating elements to said strip, means for driving said endless train to continuously sweep said elements through said presentation area, means for varying said presentation area, said varying means comprising means for varying the distance between said train-and-strip path-junctures.

3. Heating apparatus for treating a strip traveling along a given path comprising at least one endless train of heating elements having a reach extending parallel to and spaced from said path to define an area of presentation of said heating elements to said strip, means for driving said endless train in a direction parallel to said path at a rate of speed providing relative longitudinal movement between said elements and said strip to continuously sweep said elements through said presentation area so that each longitudinal portion of said strip is sequentially in heat exchange relationship with more than one heating element during its passage through said presentation area, said heating elements comprising a series of hot bodies, heat input means for heating said hot bodies, said heat input means being located along said endless train at a location without said reach.

4. Heating apparatus for treating a strip traveling along a given path comprising at least one endless train of heating elements having a reach extending along said path to define an area of presentation of said heating elements to said strip, means for driving said endless train to continuously sweep said elements through said presentation area, said heating elements comprising a seires of hot bodies, heat input means for heating said hot bodies, said heat input means being loacted along said endless train at a location isolated from said reach, said means for driving said endless train being reversible, said train passing through an intermediate zone between said input means and said area of presentation.

5. Heating apparatus for treating a strip traveling along a given path comprising at least one endless train of heating elements having a reach extending along said path to define an area of presentation of said heating elements to said strip, means for driving said endless train to continuously sweep said elements through said presentation area, said heating elements comprising a series of hot bodies, heat input means for heating said hot bodies, said heat input means being located along said endless train at a location isolated from said reach, said means for driving said endless train being variable in speed for varying the rate of heat input to the passing web.

6. Heating apparatus for treating a strip traveling along a given path comprising at least one endless train of heating elements having a reach extending along said path to define an area of presentation of said heating elements to said strip, means for driving said endless train to continuously sweep said elements through said presentation area, said heating elements compirsing a series of hot bodies, heat input means for heating said hot bodies, said heat input means being located along said endless train at a location isolated from said reach, a heat dissipation zone through which said endless train passes between said heat input means and said reach, said drive means including means for continuously varying the speed of said endless train in its endless extent whereby the rate of heat dissipation in said heat dissipation zone continuously varies and the rate of heating of said strip varies continuously in converse relationship to the rate of heat dissipation in said heat dissipation zone.

7. Heating apparatus for treating a strip traveling along a given path comprising at least one endless train of heating elements having a reach extending along said path to define an area of presentation of said heating elements to said strip, means for driving said endless train to continuously sweep said elements through said presentation area, said heating elements comprising a series of hot bodies, heat input means for heating said hot bodies, said heat input means being located along said endless train at a location isolated from said reach, a heat dissipation zone through which said endless train passes between said heat input means and said reach, means for varying the rate of heat dissipation in said heat dissipation zone.

8. Heating apparatus for treating a strip comprising first means supporting said strip and moving it along a path, at least one endless train of heating elements having a reach extending parallel to and spaced from said strip to define an area of presentation of said heating elements to said strip, said heating elements having a length in a direction lateral with respect to said strip at least equal to the lateral width of said strip, and second means moving said endless train in a direction parallel to said path at a rate producing relative longitudinal movement between said elements and said strip so that each longitudinal portion of said strip is sequentially in heat exchange relationship with more than one element during its passage through said presentation area.

References Cited by the Examiner
UNITED STATES PATENTS

| | | | |
|---|---|---|---|
| 1,633,960 | 6/1927 | Staege. | |
| 2,029,081 | 1/1936 | Mottweiler. | |
| 2,319,300 | 5/1943 | Cook | 266—3 |
| 2,319,301 | 5/1943 | Cook | 266—3 |

FOREIGN PATENTS

| | | |
|---|---|---|
| 822,369 | 9/1937 | France. |

FREDERICK L. MATTESON, JR., *Primary Examiner.*

JOHN J. CAMBY, *Examiner.*